(12) United States Patent
Fujita et al.

(10) Patent No.: US 11,326,622 B2
(45) Date of Patent: May 10, 2022

(54) OIL COOLED CENTRIFUGAL COMPRESSOR AND TURBOCHARGER INCLUDING THE SAME

(71) Applicant: MITSUBISHI HEAVY INDUSTRIES ENGINE & TURBOCHARGER, LTD., Sagamihara (JP)

(72) Inventors: Yutaka Fujita, Tokyo (JP); Yosuke Dammoto, Sagamihara (JP); Nobuhito Oka, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 15/734,046

(22) PCT Filed: Nov. 15, 2018

(86) PCT No.: PCT/JP2018/042274
§ 371 (c)(1),
(2) Date: Dec. 1, 2020

(87) PCT Pub. No.: WO2020/100251
PCT Pub. Date: May 22, 2020

(65) Prior Publication Data
US 2021/0215171 A1 Jul. 15, 2021

(51) Int. Cl.
*F04D 29/58* (2006.01)
*F04D 29/056* (2006.01)
(Continued)

(52) U.S. Cl.
CPC ......... *F04D 29/582* (2013.01); *F04D 29/056* (2013.01); *F04D 29/063* (2013.01);
(Continued)

(58) Field of Classification Search
CPC .... F04D 29/582; F04D 29/056; F04D 29/284; F04D 29/4206; F02B 39/14; F01D 25/12; F01D 25/14; F01D 25/125
See application file for complete search history.

(56) References Cited

U.S. PATENT DOCUMENTS 5,560,207 A * 10/1996 Ramsden ................ F02B 75/22
60/605.1
2002/0192089 A1 12/2002 Hill et al.
(Continued)

FOREIGN PATENT DOCUMENTS

CN        1633561 A     6/2005
CN        202579335 U   12/2012
(Continued)

OTHER PUBLICATIONS

International Preliminary Report on Patentability and Written Opinion of the International Searching Authority, with an English translation, dated May 27, 2021, for International Application No. PCT/JP2018/042274.
(Continued)

*Primary Examiner* — J. Todd Newton, Esq.
(74) *Attorney, Agent, or Firm* — Birch, Stewart, Kolasch & Birch, LLP

(57) ABSTRACT

A centrifugal compressor includes: a housing; an impeller rotatably disposed within the housing; a rotational shaft connected to the impeller; and a bearing member supporting
(Continued)

the rotational shaft in the housing. An oil flow passage through which oil flows is formed in the housing. The oil flow passage includes a lubricating oil passage through which the oil flows as lubricating oil to be supplied to the bearing member, and a cooling oil passage through which the oil flows as cooling oil for heat exchange with a fluid compressed by the impeller. The cooling oil passage is configured so that the oil flows into the cooling oil passage as the cooling oil without passing through the bearing member.

5 Claims, 8 Drawing Sheets

(51) Int. Cl.
    *F04D 29/063*    (2006.01)
    *F04D 29/28*     (2006.01)
    *F04D 29/42*     (2006.01)
    *F01M 11/02*     (2006.01)
    *F02B 39/00*     (2006.01)

(52) U.S. Cl.
    CPC ....... *F04D 29/284* (2013.01); *F04D 29/4206* (2013.01); *F01M 11/02* (2013.01); *F01M 2011/021* (2013.01); *F02B 39/005* (2013.01)

(56) References Cited

U.S. PATENT DOCUMENTS

| | | | |
|---|---|---|---|
| 2007/0036664 A1 | 2/2007 | Shibui et al. | |
| 2015/0300202 A1* | 10/2015 | Maeda | F01D 25/10 |
| | | | 415/180 |
| 2018/0245224 A1 | 8/2018 | Takahashi et al. | |

FOREIGN PATENT DOCUMENTS

| | | | |
|---|---|---|---|
| DE | 19652754 A1 * | 6/1998 | ............ F01P 3/12 |
| DE | 20 2013 007 472 U1 | 11/2013 | |
| JP | 1-178723 A | 7/1989 | |
| JP | 2007-46570 A | 2/2007 | |
| JP | 2008-248706 A | 10/2008 | |
| JP | 2011-256832 A | 12/2011 | |
| JP | 2014-129724 A | 7/2014 | |
| JP | 2016-75183 A | 5/2016 | |
| WO | WO 02/086324 A2 | 10/2002 | |
| WO | WO 2017/188422 A1 | 11/2017 | |

OTHER PUBLICATIONS

International Search Report, dated Jan. 29, 2019, for International Application No. PCT/JP2018/042274, with an English translation.
Extended European Search Report for European Application No. 18939852.2, dated Sep. 17, 2021.
Office Action dated Nov. 2, 2021 issued in counterpart Japanese Application No. 2020-556524 with an English Translation.
Office Action dated Dec. 20, 2021 issued in counterpart Chinese Application No. 201880095688.2 with an English Translation.

* cited by examiner

OIL COOLED CENTRIFUGAL COMPRESSOR AND TURBOCHARGER INCLUDING THE SAME

TECHNICAL FIELD

The present disclosure relates to a centrifugal compressor and a turbocharger including the centrifugal compressor.

BACKGROUND

Generally, a fluid compressed by a centrifugal compressor has a high temperature. In a turbocharger, when the high-temperature air compressed by the centrifugal compressor is supplied to the engine as it is, an abnormality such as knocking or pre-ignition may occur and the performance of the engine may deteriorate. In addition, the temperature of the air discharged from the centrifugal compressor of the turbocharger tends to increase year by year due to the increasing needs for the introduction of EGR (exhaust gas recirculation) and the application of the lean burn Miller cycle. Therefore, a technique for cooling the compressed air in a centrifugal compressor of a turbocharger has been developed. For example, Patent Document 1 discloses a turbocharger that performs cooling by spraying cooling lubricating oil from the bearing housing side to an upper portion of a seal plate located on the back surface of the impeller of the centrifugal compressor.

CITATION LIST

Patent Literature

Patent Document 1: JP2008-248706A

SUMMARY

Problems to be Solved

However, in the turbocharger disclosed in Patent Document 1, since lubricating oil is sprayed to an upper portion of the seal plate located on the back surface of the impeller of the centrifugal compressor after lubricating a bearing rotatably supporting the rotational shaft, the temperature of the lubricating oil rises during the lubrication of the bearing, so that the lubricating oil having a high temperature is sprayed to the seal plate. Therefore, in the recent turbocharger in which the temperature of the air discharged from the centrifugal compressor tends to increase, there is a problem that the compressed air may not be cooled as expected in the centrifugal compressor.

In view of the above, an object of at least one embodiment of the present disclosure is to provide a centrifugal compressor with an improved cooling performance for a compressed fluid, and a turbocharger including the centrifugal compressor.

Solution to the Problems (1) A centrifugal compressor according to at least one embodiment of the present invention comprises: a housing; an impeller rotatably disposed within the housing; a rotational shaft connected to the impeller; and a bearing member supporting the rotational shaft in the housing. An oil flow passage through which oil flows is formed in the housing. The oil flow passage includes a lubricating oil passage through which the oil flows as lubricating oil to be supplied to the bearing member, and a cooling oil passage through which the oil flows as cooling oil for heat exchange with a fluid compressed by the impeller. The cooling oil passage is configured so that the oil flows into the cooling oil passage as the cooling oil without passing through the bearing member.

With the above configuration (1), since the oil flows into the cooling oil passage as the cooling oil without passing through the bearing member, the temperature of the cooling oil used for heat exchange with a fluid compressed by the impeller is decreased compared with the case where the oil flows into the cooling oil passage through the bearing member. Thus, it is possible to improve the cooling performance for compressed fluid in the centrifugal compressor.

(2) In some embodiments, in the above configuration (1), at least a part of the cooling oil flowing through the cooling oil passage flows into the lubricating oil passage as the lubricating oil.

With this configuration, at least a part of the cooling oil with an increased temperature due to heat exchange with a compressed fluid flows into the lubricating oil passage as the lubricating oil. Since the higher the temperature, the lower the viscosity of the lubricating oil, it is possible to reduce the mechanical loss when the lubricating oil lubricates the bearing member.

(3) In some embodiments, in the above configuration (2), all of the cooling oil having flowed through the cooling oil passage flows into the lubricating oil passage as the lubricating oil.

With this configuration, since the cooling oil passage and the lubricating oil passage are connected in series, the configuration of the oil flow passage is simplified.

(4) In some embodiments, in the above configuration (2), the bearing member include a thrust bearing. The lubricating oil passage includes an oil supply passage connecting the thrust bearing and the cooling oil passage. At least a part of the cooling oil flowing through the cooling oil passage is supplied to the thrust bearing through the oil supply passage.

In the case where the bearing member includes a thrust bearing and a journal bearing, as the rotational speed of the centrifugal compressor increases, the loss ratio of the thrust bearing to the total shaft loss increases relative to that of the journal bearing. In this regard, with the above configuration (4), since the hot cooling oil after cooling a fluid compressed by the impeller is directly supplied to the thrust bearing as the lubricating oil, it is possible to increase the loss reduction effect on the thrust bearing with a large loss ratio. As a result, it is possible to increase the effect of reducing the overall shaft loss.

(5) In some embodiments, in the above configuration (1), the cooling oil passage includes a communication passage communicating with the lubricating oil passage on an upstream side of the bearing member, and a part of the lubricating oil flowing through the lubricating oil passage flows into the cooling oil passage through the communication passage.

With the above configuration (5), since a part of the lubricating oil flowing through the lubricating oil passage flows into the cooling oil passage as the cooling oil without passing through the bearing member, the temperature of the cooling oil used for heat exchange with a fluid compressed by the impeller is decreased compared with the case where the oil flows into the cooling oil passage through the bearing member. Thus, it is possible to improve the cooling performance for compressed fluid in the centrifugal compressor.

(6) In some embodiments, in the above configuration (5), the bearing member includes a thrust bearing and a journal bearing, the lubricating oil passage includes a first branch passage communicating with the thrust bearing and a second branch passage communicating with the journal bearing, and the communication passage communicates with the first branch passage on an upstream side of the thrust bearing.

Unlike the thrust bearing, the journal bearing always supports the rotational shaft during the rotation of the rotational shaft, and thus needs to be always lubricated with the lubricating oil. In this regard, according to the above configuration (6), the lubricating oil flowing through the lubricating oil passage and then flowing into the cooling oil passage as the cooling oil is a part of the lubricating oil flowing through the first branch passage to be supplied to the thrust bearing. Accordingly, even when a part of the lubricating oil flowing through the lubricating oil passage flows into the cooling oil passage, there is little effect on the flow rate of the lubricating oil flowing through the second branch passage to be supplied to the journal bearing. Thus, it is possible to reduce the adverse effect on lubrication of the journal bearing.

(7) In some embodiments, in any one of the above configurations (4) to (6), the cooling oil passage includes an outlet for discharging the cooling oil from the cooling oil passage, and the outlet is located at a vertically lowest position in the cooling oil passage.

With this configuration, since the cooling oil flowing through the cooling oil passage is discharged from the cooling oil passage through the outlet due to its own weight, it is possible to easily recover the cooling oil.

(8) In some embodiments, in any one of the above configurations (1) to (7), the housing includes a plate member positioned on a back side of the impeller, and at least a part of the cooling oil passage is formed in the plate member.

With this configuration, since the impeller can be efficiently cooled, it is possible to extend the lifetime of the impeller.

(9) In some embodiments, in the above configuration (3), the centrifugal compressor comprises: a bypass line bypassing the cooling oil passage and communicating with the lubricating oil passage; and a switch member for switching so that the oil bypasses the cooling oil passage and flows through the bypass line.

When the temperature of a fluid entering the centrifugal compressor is low, the temperature of the cooling oil may be higher than the temperature of the compressed fluid in the centrifugal compressor. In this case, the compressed fluid is heated by heat exchange with the cooling oil in the centrifugal compressor. However, with the above configuration (9), when the temperature of a fluid entering the centrifugal compressor is low, the oil bypasses the cooling oil passage and flows directly into the lubricating oil passage as the lubricating oil, so that the oil does not heat the air compressed by the impeller. Thus, it is possible to reduce a risk of increasing the temperature of the air discharged from the centrifugal compressor.

(10) In some embodiments, in the above configuration (1), the centrifugal compressor comprises: a lubricating oil circulation system for circulating the oil through the lubricating oil passage as the lubricating oil; and a cooling oil circulation system for circulating the oil through the cooling oil passage as the cooling oil. The lubricating oil circulation system and the cooling oil circulation system are independent from each other.

With this configuration, since the circulation of the cooling oil and the circulation of the lubricating oil are independent from each other, it is possible to achieve the effect of cooling the fluid compressed by the impeller and the effect of lubricating the bearing member without affecting each other.

(11) A turbocharger according to at least one embodiment of the present invention comprises: the centrifugal compressor described in any one of the above (1) to (10).

With this configuration, since the oil flows into the cooling oil passage as the cooling oil without passing through the bearing member, the temperature of the cooling oil used for heat exchange with a fluid compressed by the impeller is decreased compared with the case where the oil flows into the cooling oil passage through the bearing member. Thus, it is possible to improve the cooling performance for compressed fluid in the centrifugal compressor.

Advantageous Effects

According to at least one embodiment of the present disclosure, since the oil flows into the cooling oil passage as the cooling oil without passing through the bearing member, the temperature of the cooling oil used for heat exchange with a fluid compressed by the impeller is decreased compared with the case where the oil flows into the cooling oil passage through the bearing member. Thus, it is possible to improve the cooling performance for compressed fluid in the centrifugal compressor.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

A centrifugal compressor according to some embodiments of the present disclosure will be described by taking a centrifugal compressor of a turbocharger as an example.

However, the centrifugal compressor of the present disclosure is not limited to a centrifugal compressor of a turbocharger, and may be any centrifugal compressor which operates alone. Although a fluid to be compressed by the compressor is air in the following description, the fluid may be replaced by any other fluid.

First Embodiment

Figure 1:
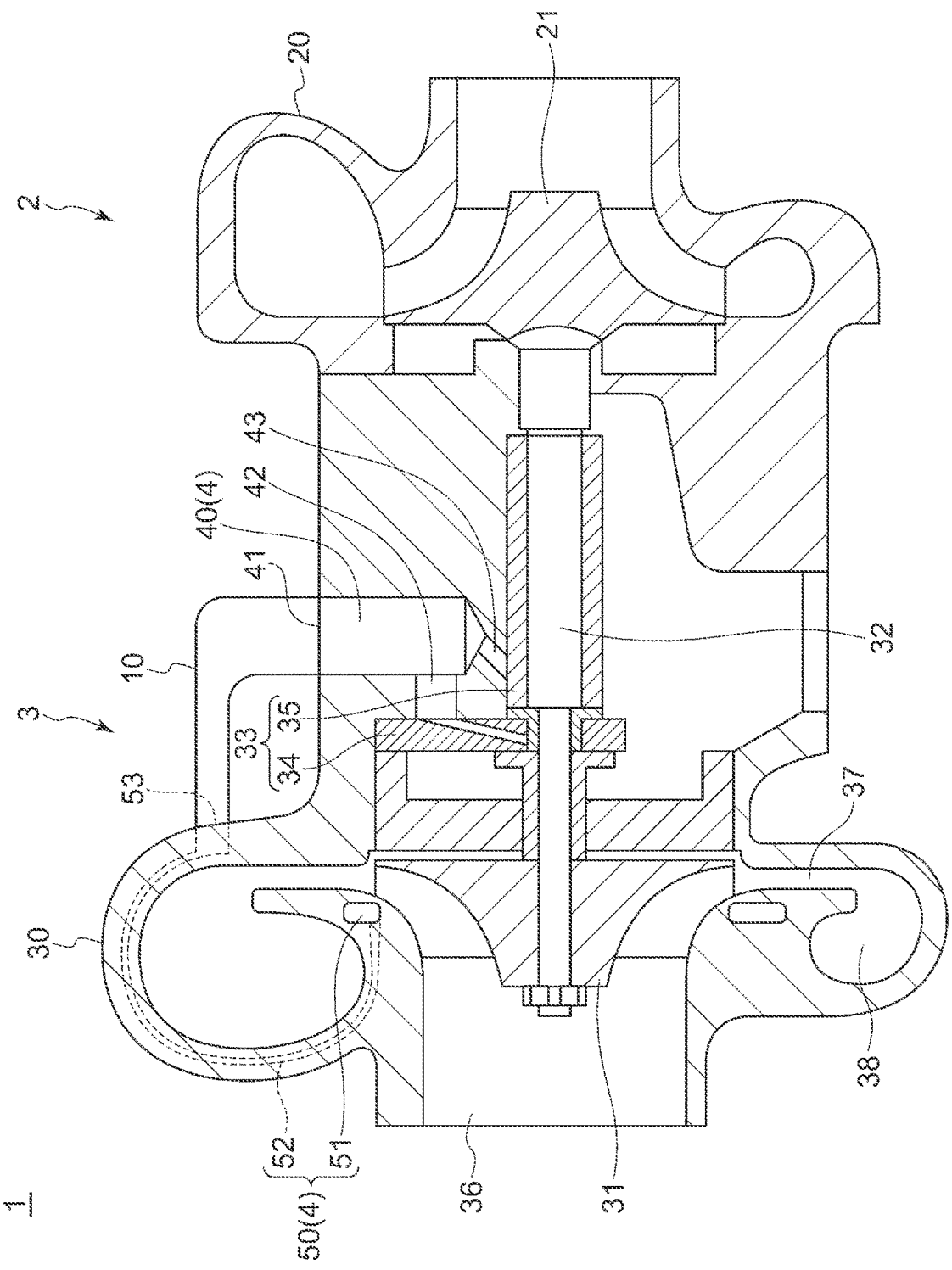
FIG. 1 is a cross-sectional view of a turbocharger according to a first embodiment of the present disclosure.

As shown in FIG. 1, a turbocharger 1 according to a first embodiment of the present disclosure includes a turbine 2 and a centrifugal compressor 3. The turbine 2 includes a housing 20 and an impeller 21 rotatably disposed within the housing 20.

The centrifugal compressor 3 includes a housing 30, an impeller 31 rotatably disposed within the housing 30, a rotational shaft 32 connected at one end to the impeller 31, and a bearing member 33 supporting the rotational shaft 32 in the housing 30. The bearing member 33 includes a thrust bearing 34 supporting the rotational shaft 32 in the axial direction and a journal bearing 35 supporting the rotational shaft 32 in a direction perpendicular to the axial direction. The other end of the rotational shaft 32 is connected to the impeller 21. With this configuration, when the impeller 21 rotates, the rotation is transmitted to the impeller 31 via the rotational shaft 32, and the impeller 31 rotates.

The housing 30 has an inlet passage 36 through which the air enters, and a diffuser passage 37 and a scroll passage 38 which are positioned on the discharge side of the impeller 31. Further, the housing 30 has an oil flow passage 4 through which oil flows. The oil flow passage 4 includes a lubricating oil passage 40 through which the oil flows as lubricating oil to be supplied to the bearing member 33, and a cooling oil passage 50 formed so as to surround the impeller 31 on the circumferential inner side of the scroll passage 38. When the cooling oil passage 50 is formed at such a position in the housing 30, the oil flowing through the cooling oil passage 50 can exchange heat with the air compressed by the impeller 31.

One end of the lubricating oil passage 40 opens to the housing 30. This opening forms an inlet 41 through which the oil enters as lubricating oil. The lubricating oil passage 40 extends from the inlet 41 into the housing 30, and diverges into a first branch passage 42 and a second branch passage 43. The first branch passage 42 communicates with the thrust bearing 34, and the second branch passage 43 communicates with the journal bearing 35. Although the lubricating oil passage 40 on the downstream side of the thrust bearing 34 and the journal bearing 35 is not shown in FIG. 1, it is connected to an oil supply source (not shown in FIG. 1, but schematically shown in FIG. 3).

The cooling oil passage 50 is connected at one end to the oil supply source. The cooling oil passage 50 includes an annular portion 51 communicating at one end with the supply source and surrounding the impeller 31 on the circumferential inner side of the scroll passage 38, and a communication portion 52 extending from the other end of the annular portion 51 so as to surround the scroll passage 38 in a direction perpendicular to the axial direction of the scroll passage 38. An end of the communication portion 52 opposite to the end connected to the annular portion 51 opens to the housing 30. This opening forms an outlet 53 through which the oil as cooling oil is discharged from the cooling oil passage 50.

Outside the housing 30, the outlet 53 and the inlet 41 are connected via a connection pipe 10. The connection pipe 10 connects the cooling oil passage 50 and the lubricating oil passage 40 in series with each other. With this configuration, the configuration of the oil flow passage 4 formed in the housing 30 can be simplified. The cooling oil passage 50 and the lubricating oil passage 40 may be connected in series inside the housing 30 without using the connection pipe 10 located outside the housing 30.

Next, the operation of the turbocharger 1 according to the first embodiment of the present disclosure will be described based on FIG. 1. Exhaust gas discharged from an engine (not shown) enters the turbine 2 and rotates the impeller 21. When the impeller 21 rotates, the rotation is transmitted to the impeller 31 via the rotational shaft 32, and the impeller 31 rotates. Air entering the centrifugal compressor 3 through the inlet passage 36 is compressed by rotation of the impeller 31 and flows into the scroll passage 38 through the diffuser passage 37. The compressed air flowing into the scroll passage 38 passes through the scroll passage 38 and is then discharged from the centrifugal compressor 3. The air discharged from the centrifugal compressor 3 is taken into the engine as intake air.

The air compressed by the impeller 31 in the centrifugal compressor 3 has not only an increased pressure but also an increased temperature. If the temperature of the air discharged from the centrifugal compressor 3 is too high, the engine performance may be reduced. However, in the turbocharger 1, since the air compressed by the impeller 31 is cooled by the operation described below, it is possible to suppress an increase in temperature of the air discharged from the centrifugal compressor 3.

During the operation of the turbocharger 1, oil is supplied from the oil supply source to the cooling oil passage 50, and the oil flows through the annular portion 51 of the cooling oil passage 50 as the cooling oil. The cooling oil flowing through the annular portion 51 exchanges heat with each of the air compressed by the impeller 31, the air flowing through the diffuser passage 37, and the air flowing through the scroll passage 38. That is, since the air entering the centrifugal compressor 3 is cooled by the cooling oil while being compressed by the impeller 31 and flowing through the diffuser passage 37 and the scroll passage 38, the increase in temperature of the air discharged from the centrifugal compressor 3 is suppressed compared with the case where such cooling operation is not performed.

The oil serving as the cooling oil used for heat exchange with the air in the centrifugal compressor 3 flows from the annular portion 51 into the communication portion 52 and passes through the communication portion 52. Then, the oil flows into the connection pipe 10 through the outlet 53 and passes through the connection pipe 10. The oil having passed through the connection pipe 10 flows into the lubricating oil passage 40 through the inlet 41 as the lubricating oil. The lubricating oil entering the lubricating oil passage 40 flows through the lubricating oil passage 40 and is divided into the first branch passage 42 and the second branch passage 43. The lubricating oil flowing through the first branch passage 42 is supplied to the thrust bearing 34 and lubricates the thrust bearing 34, while the lubricating oil flowing through the second branch passage 43 is supplied to the journal bearing 35 and lubricates the journal bearing 35. The lubricating oil having lubricated the thrust bearing 34 and the journal bearing 35 is discharged from the housing 30 and returns to the oil supply source.

The cooling oil for heat exchange with the compressed air in the centrifugal compressor 3 cools the compressed air while increasing its own temperature. Accordingly, the oil flowing into the lubricating oil passage 40 as the lubricating oil after flowing through the cooling oil passage 50 as the cooling oil has higher temperature than oil directly flowing from the oil supply source into the lubricating oil passage 40. Since, generally, the higher the temperature, the lower the viscosity of the lubricating oil, the centrifugal compressor 3 according to the first embodiment can reduce the mechanical loss when the lubricating oil lubricates the bearing member 33.

As described above, in the turbocharger 1, the oil from the oil supply source directly flows into the cooling oil passage 50 as the cooling oil. If the oil directly flows from the oil supply source to the lubricating oil passage 40 to lubricate the bearing member 33 and then flows into the cooling oil passage 50 as the cooling oil, the temperature of the cooling oil flowing through the cooling oil passage 50 is increased as compared to the above-described operation, so that the cooling performance for compressed air in the centrifugal compressor 3 is reduced. Therefore, in the turbocharger 1 according to the first embodiment, since the oil flows into the cooling oil passage 50 as the cooling oil without passing through the bearing member 33, the temperature of the cooling oil used for heat exchange with the air compressed by the impeller 31 is decreased compared with the case where the oil flows into the cooling oil passage 50 through the bearing member 33. Thus, it is possible to improve the cooling performance for compressed air in the centrifugal compressor 3.

Figure 2:
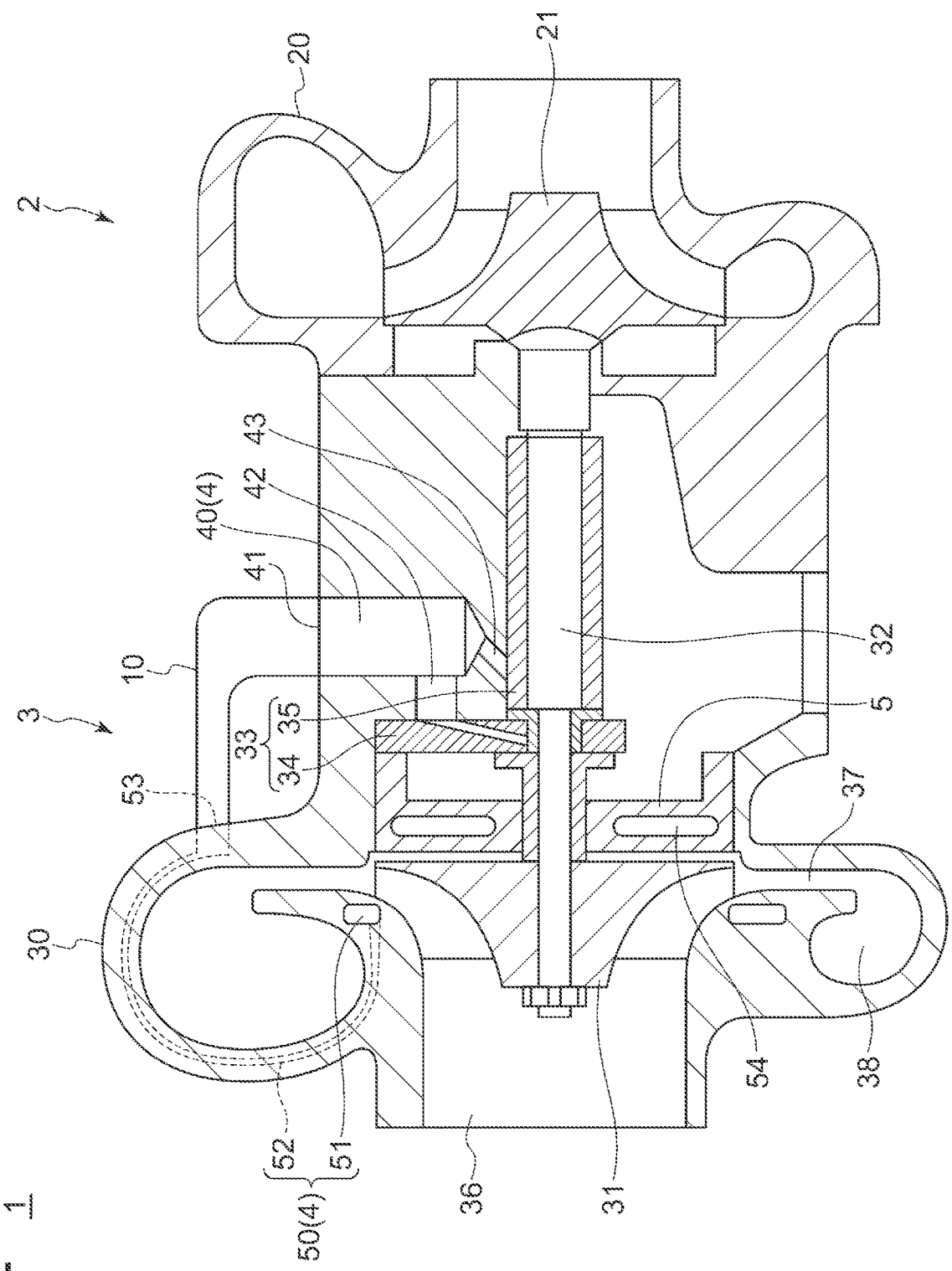
FIG. 2 is a cross-sectional view of a modified example of the turbocharger according to the first embodiment of the present disclosure.

In the first embodiment, the cooling oil passage 50 has the annular portion 51 surrounding the impeller 31 on the circumferential inner side of the scroll passage 38. However, instead of the annular portion 51, or in addition to the annular portion 51 as shown in FIG. 2, a second annular portion 54 through which the cooling oil flows may be formed in a plate member 5, positioned on the back side of the impeller 31 and facing the impeller 31, so that the second annular portion 54 surrounds the rotational shaft 32. The plate member 5 is a part of the housing 30.

In the case where both the annular portion 51 and the second annular portion 54 are formed, the annular portion 51 and the second annular portion 54 may be communicated with each other so that the oil supplied from the oil supply source to the cooling oil passage 50 flows through both the annular portion 51 and the second annular portion 54 as the cooling oil, then flows through the communication portion 52, and flows out of the cooling oil passage 50 through the outlet 53. During the operation of the centrifugal compressor 3, the impeller 31 is heated by heat generated by friction due to rotation and heat of the compressed air, but the impeller 31 can be cooled by heat exchange between the impeller 31 and the cooling oil that flows through the second annular portion 54. As a result, since the impeller 31 can be efficiently cooled, it is possible to extend the lifetime of the impeller 31. When the impeller 31 is cooled, the air compressed by the impeller 31 is also cooled. That is, the cooling oil flowing through the second annular portion 54 indirectly exchanges heat with the air compressed by the impeller 31 via the impeller 31.

Figure 3:
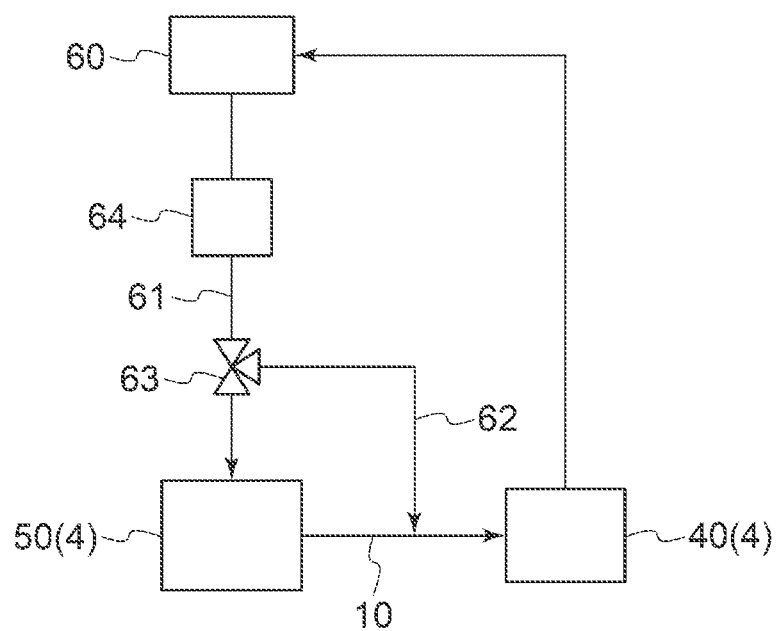
FIG. 3 is a schematic view of an oil circulation passage in another modified example of the turbocharger according to the first embodiment of the present disclosure.

In the first embodiment, the oil is always supplied from the supply source to the cooling oil passage 50, but the embodiment is not limited thereto. As schematically shown in FIG. 3, a bypass line 62 may be branched from an oil supply line 61 connecting from the oil supply source 60 to one end of the cooling oil passage 50, the bypass line 62 may be connected to the connection pipe 10, and a three-way valve 63 (switch member) may be disposed at a branch point between the oil supply line 61 and the bypass line 62. To supply the oil from the oil supply source 60 to the cooling oil passage 50, an oil supply pump 64 may disposed on the oil supply line 61. With this configuration, by the three-way valve 63, the oil flowing through the oil supply line 61 can bypass the cooling oil passage 50 and flow through the connection pipe 10 and the lubricating oil passage sequentially.

When the temperature of the air entering the centrifugal compressor 3 (see FIG. 1) is low, the temperature of the cooling oil may be higher than the temperature of the compressed air in the centrifugal compressor 3. In this case, the compressed air is heated by heat exchange with the cooling oil. However, with the configuration shown in FIG. 3, when the temperature of the air entering the centrifugal compressor 3 is low, the oil bypasses the cooling oil passage 50 and flows directly into the lubricating oil passage 40 as the lubricating oil, so that the oil does not heat the air compressed by the impeller 31 (see FIG. 1). Thus, it is possible to reduce a risk of increasing the temperature of the compressed air in the centrifugal compressor 3.

Second Embodiment

Next, the turbocharger according to the second embodiment will be described. The turbocharger according to the second embodiment is different from the first embodiment in that the configuration of the oil flow passage is modified. In the second embodiment, the same constituent elements as those in the first embodiment are associated with the same reference numerals and not described again in detail.

Figure 4:
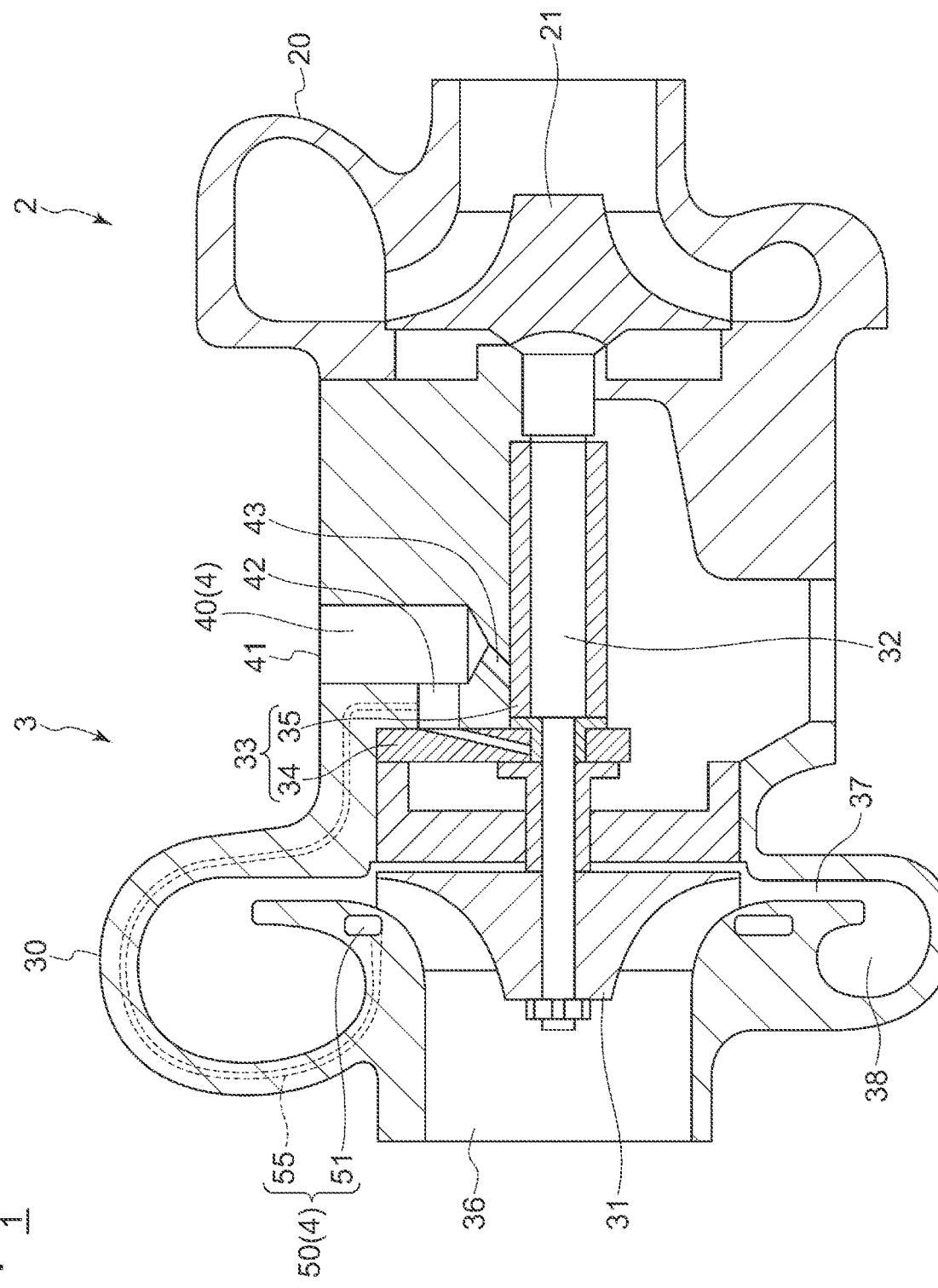
FIG. 4 is a cross-sectional view of a turbocharger according to a second embodiment of the present disclosure.

As shown in FIG. 4, the turbocharger 1 according to the second embodiment of the present disclosure is configured so that the oil is directly supplied from the oil supply source 60 (see FIG. 3) to the lubricating oil passage 40 as the lubricating oil. The cooling oil passage 50 includes a communication passage 55 formed so as to surround the scroll passage 38 in a direction perpendicular to the axial direction instead of the communication portion 52 of the turbocharger 1 according to the first embodiment. The communication passage 55 communicates at one end with the annular portion 51 and communicates at the other end with the first branch passage 42 of the lubricating oil passage 40 on the upstream side of the thrust bearing 34. The configuration is otherwise the same as that of the first embodiment.

In the turbocharger 1 according to the second embodiment of the present disclosure, the oil is supplied from the oil supply source 60 to the lubricating oil passage 40 through the inlet 41 as the lubricating oil. The lubricating oil flowing through the lubricating oil passage 40 is divided into the first branch passage 42 and the second branch passage 43. The lubricating oil flowing through the second branch passage 43 is supplied to the journal bearing 35, and after lubricating the journal bearing 35, returns to the oil supply source 60. On the other hand, a part of the lubricating oil flowing through the first branch passage 42 is supplied to the thrust bearing 34, and after lubricating the thrust bearing 34, returns to the oil supply source 60.

The remainder of the lubricating oil flowing through the first branch passage 42 flows into the communication passage 55 as the cooling oil. The cooling oil entering the communication passage 55 exchanges heat with the air flowing through the scroll passage 38 while flowing through the communication passage 55 to cool the air. The cooling oil flowing through the communication passage 55 then flows into the annular portion 51 and exchanges heat with each of the air compressed by the impeller 31, the air flowing through the diffuser passage 37, and the air flowing through the scroll passage 38 while flowing through the annular portion 51 as with the first embodiment. The cooling oil flowing out of the annular portion 51 returns to the oil supply source 60.

In the turbocharger 1 according to the second embodiment, a part of the lubricating oil flowing through the lubricating oil passage 40 flows into the cooling oil passage 50 as the cooling oil without passing through the bearing member 33, so that, as with the first embodiment, the temperature of the cooling oil used for heat exchange with the air compressed by the impeller 31 is decreased compared with the case where the oil flows into the cooling oil passage 50 through the bearing member 33. Thus, it is possible to improve the cooling performance for compressed air in the centrifugal compressor 3.

Further, in the turbocharger 1, the journal bearing 35 always supports the rotational shaft 32 during the rotation of the rotational shaft 32, and thus needs to be always lubricated with the lubricating oil, unlike the thrust bearing 34. In this regard, in the turbocharger 1 according to the second embodiment, the lubricating oil flowing through the lubricating oil passage 40 and then flowing into the cooling oil passage 50 as the cooling oil is a part of the lubricating oil flowing through the first branch passage 42 to be supplied to the thrust bearing 34. Accordingly, even when a part of the lubricating oil flowing through the lubricating oil passage 40 flows into the cooling oil passage 50, there is little effect on the flow rate of the lubricating oil flowing through the second branch passage 43 to be supplied to the journal bearing 35. Thus, it is possible to reduce the adverse effect on lubrication of the journal bearing 35.

Figure 5:
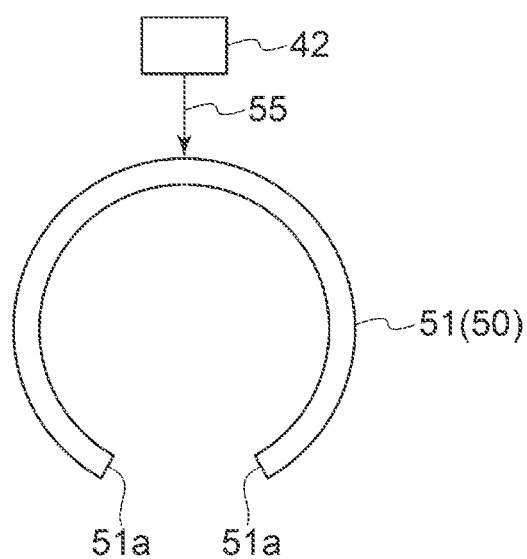
FIG. 5 is a schematic configuration diagram of an annular portion of a cooling oil passage in a modified example of the turbocharger according to the second embodiment of the present disclosure.

In the second embodiment, as shown in FIG. 5, the annular portion 51 of the cooling oil passage 50 may include an outlet 51a for discharging the cooling oil from the annular portion 51 to the outside of the housing 30 (see FIG. 4), and the outlet 51a may be located at the vertically lowest position in the annular portion 51. With this configuration, since the cooling oil flowing through the cooling oil passage 50 is discharged from the cooling oil passage 50 through the outlet 51a due to its own weight, it is possible to easily recover the cooling oil. The oil discharged from the cooling oil passage 50 through the outlet 51a may be recovered by, for example, an oil pan (not shown) and may return from the oil pan to the oil supply source 60 by a pump or the like. Additionally, in this configuration, the communication passage 55 is preferably connected to the annular portion 51 at the vertically uppermost position of the annular portion 51 in order to uniformly flow the cooling oil through the annular portion 51.

In the second embodiment, as shown in FIG. 4, the communication passage 55 is formed so that the communication passage 55 connects the first branch passage 42 and the annular portion 51, but the embodiment is not limited thereto. The communication passage 55 may be formed so that the communication passage 55 connects the second branch passage 43 and the annular portion 51, or the communication passage 55 may be formed so as to connect the lubricating oil passage 40 and the annular portion 51 on the upstream side of the portion at which the first branch passage 42 and the second branch passage 43 are branched. Further, in the second embodiment, when the cooling oil passage 50 includes the second annular portion 54 (see FIG. 2), the communication passage 55 may be formed so that the communication passage 55 connects the second branch passage 43 and the second annular portion 54.

Third Embodiment

Next, the turbocharger according to the third embodiment will be described. The turbocharger according to the third embodiment is different from the first embodiment in that the configuration of the oil flow passage is modified. In the third embodiment, the same constituent elements as those in the first embodiment are associated with the same reference numerals and not described again in detail.

Figure 6:
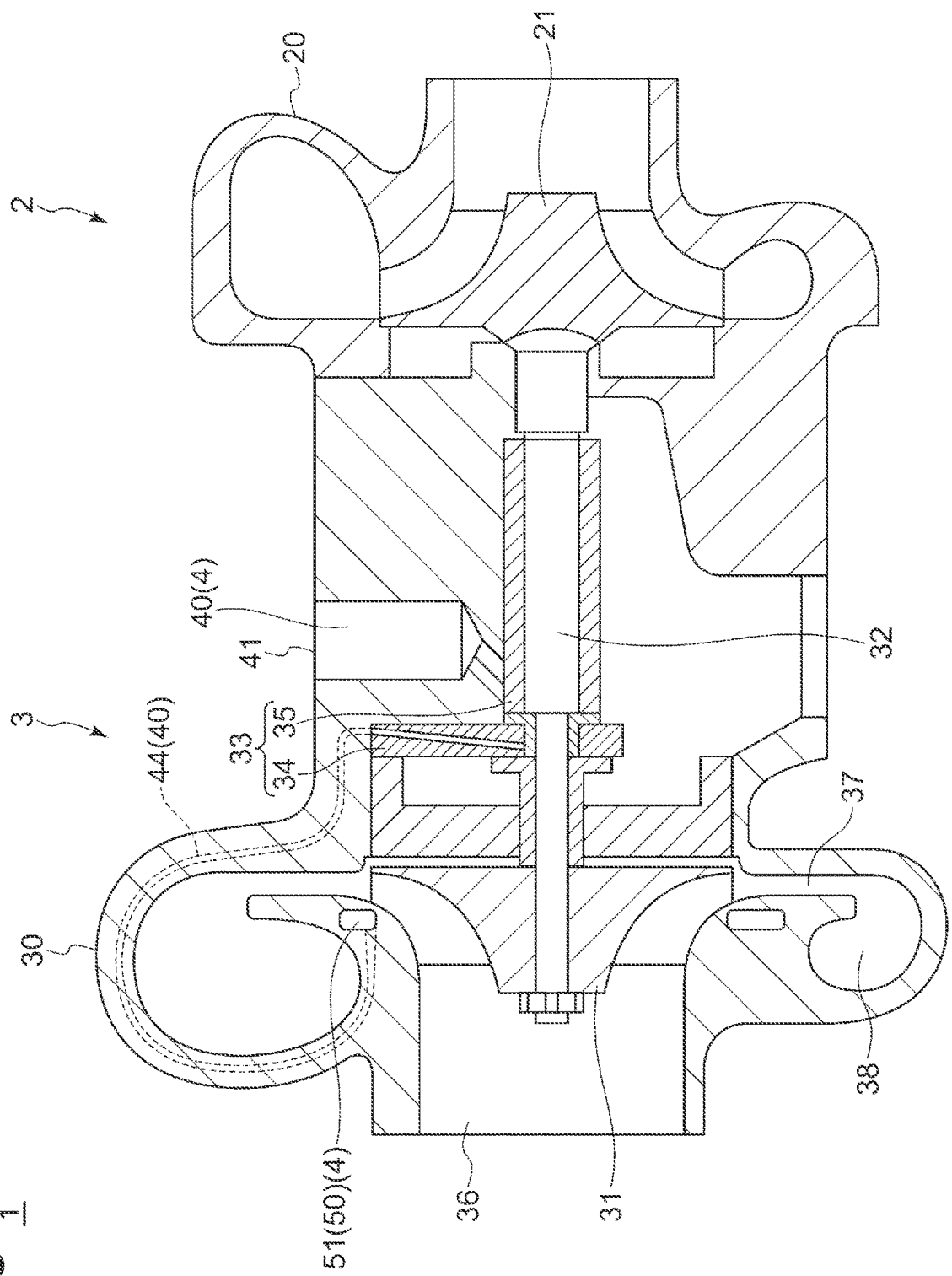
FIG. 6 is a cross-sectional view of a turbocharger according to a third embodiment of the present disclosure.

As shown in FIG. 6, the turbocharger 1 according to the third embodiment of the present disclosure is configured so that the oil is directly supplied from the oil supply source 60 (see FIG. 3) to the lubricating oil passage 40 and the cooling oil passage as the lubricating oil and the cooling oil, respectively. The lubricating oil passage 40 does not diverge into two branch passages but communicates only with the journal bearing 35. The lubricating oil passage 40 includes, as a passage for supplying the lubricating oil to the thrust bearing 34, an oil supply passage 44 communicating at one end with the thrust bearing 34 and communicating at the other end with the annular portion 51 of the cooling oil passage 50. The oil supply passage 44 extends so as to surround the scroll passage 38 in a direction perpendicular to the axial direction of the scroll passage 38. In the case where the second annular portion 54 is formed in the plate member 5 as shown in FIG. 2, the oil supply passage 44 may communicate at one end with the thrust bearing 34 and communicate at the other end with the second annular portion 54. The configuration is otherwise the same as that of the first embodiment.

In the turbocharger 1 according to the third embodiment of the present disclosure, the oil is supplied from the oil supply source 60 to the lubricating oil passage 40 through the inlet 41 as the lubricating oil. The lubricating oil flowing through the lubricating oil passage 40 is supplied to the journal bearing 35, and after lubricating the journal bearing 35, returns to the oil supply source 60.

Further, the oil is supplied from the oil supply source 60 to the annular portion 51 of the cooling oil passage 50 as the cooling oil. The cooling oil flowing through the annular portion 51 exchanges heat with each of the air compressed by the impeller 31, the air flowing through the diffuser passage 37, and the air flowing through the scroll passage 38, as with the first embodiment.

In the turbocharger 1 according to the third embodiment, as with the first embodiment, the oil not having flowed through the lubricating oil passage 40 flows into the cooling oil passage 50 as the cooling oil, so that the temperature of the cooling oil used for heat exchange with the air compressed by the impeller 31 is decreased compared with the case where the oil flows into the cooling oil passage 50 through the bearing member 33. Thus, it is possible to improve the cooling performance for compressed air in the centrifugal compressor 3.

The cooling oil having passed through the annular portion 51 flows into the oil supply passage 44 of the lubricating oil passage 40 as the lubricating oil. The lubricating oil entering the oil supply passage 44 is supplied to the thrust bearing 34 through the oil supply passage 44, and after lubricating the thrust bearing 34, returns to the oil supply source 60. In the third embodiment, unlike the first embodiment where the cooling oil having flowed through the cooling oil passage 50 flows into the lubricating oil passage 40 as the lubricating oil and is divided to lubricate each of the thrust bearing 34 and the journal bearing 35, all of the cooling oil having flowed through the cooling oil passage 50 is supplied to the thrust bearing 34 as the lubricating oil through the oil supply passage 44 of the lubricating oil passage 40.

In the case where the bearing member 33 includes the thrust bearing 34 and the journal bearing 35 as in the turbocharger 1 according to the third embodiment, as the rotational speed of the centrifugal compressor 3 increases, the loss ratio of the thrust bearing to the total shaft loss increases relative to that of the journal bearing. In this regard, in the turbocharger 1 according to the third embodiment, since the hot cooling oil after cooling the air compressed by the impeller 31, i.e., the cooling oil with a low viscosity is directly supplied to the thrust bearing 34 as the lubricating oil, it is possible to increase the loss reduction effect on the thrust bearing 34 with a large loss ratio. As a result, it is possible to increase the effect of reducing the overall shaft loss.

Figure 7A:
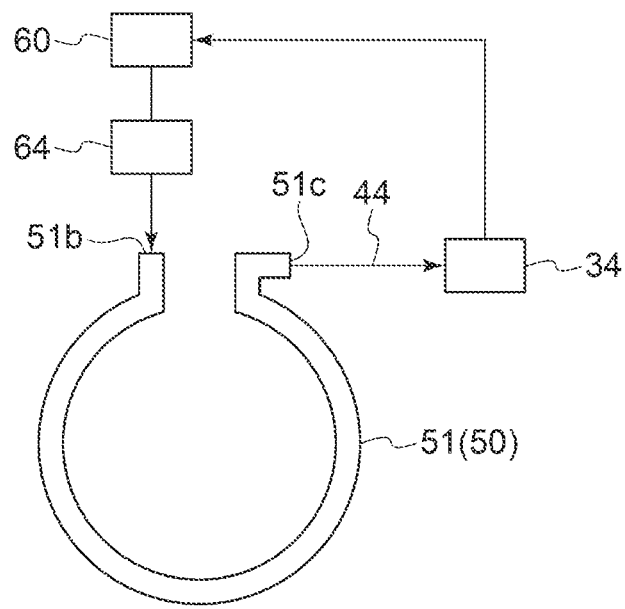
FIGS. 7 and 7B are a schematic configuration diagram of an annular portion of a cooling oil passage in a modified example of the turbocharger according to the third embodiment of the present disclosure.

In the third embodiment, to supply all of the cooling oil having flowed through the cooling oil passage 50 to the thrust bearing 34, as shown in FIG. 7A, the cooling oil may be supplied from the oil supply source 60 to the annular portion 51 through one end 51b of the annular portion 51, and the other end 51c of the annular portion 51 may be connected to one end of the oil supply passage 44.

Figure 7B:
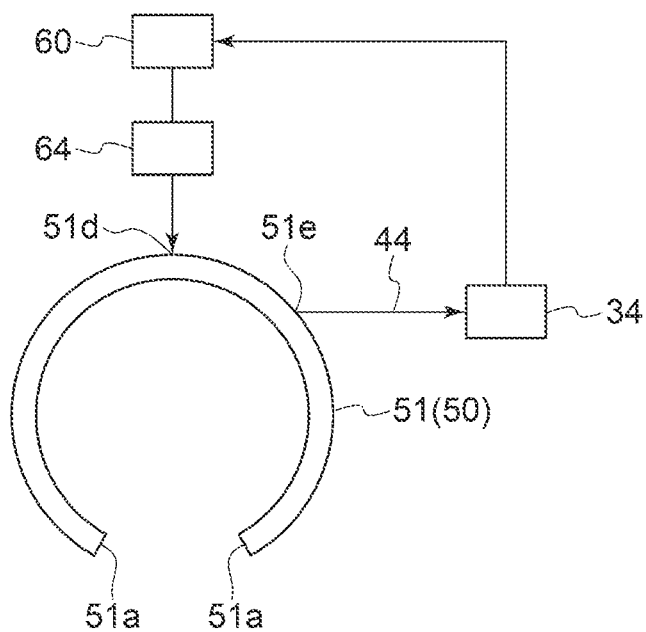

In the third embodiment, a part of the cooling oil having passed through the cooling oil passage 50 may be supplied to the thrust bearing 34. To this end, as shown in FIG. 7B, the cooling oil may be supplied from the oil supply source 60 to the annular portion 51 through an inlet 51d located at the vertically uppermost position of the annular portion 51, and one end of the oil supply passage 44 may be connected to a collection port 51e provided between the inlet 51d and the outlet 51a. In this case, when the outlet 51a is formed at the vertically lowest position in the annular portion 51, it is possible to easily recover the cooling oil, as with the second embodiment.

Figure 8:
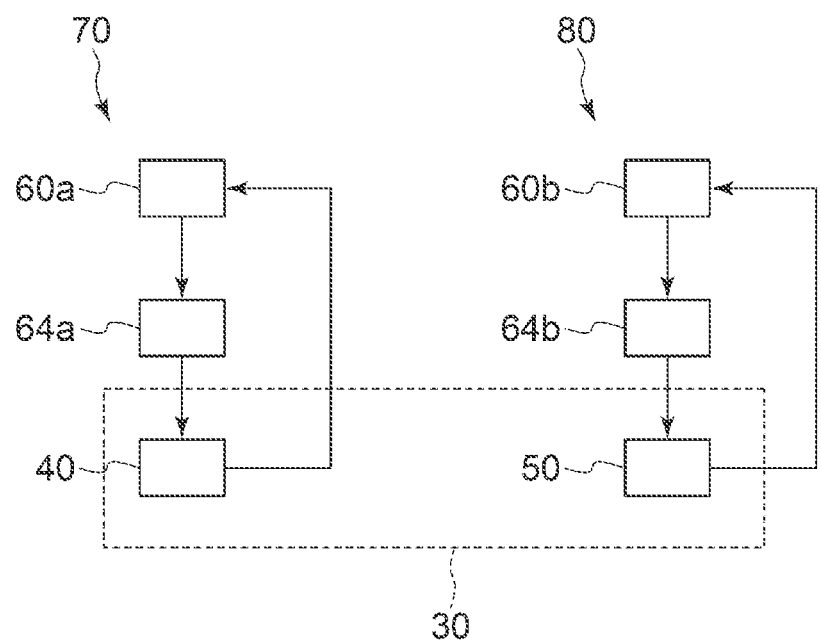
FIG. 8 is a schematic configuration diagram of a lubricating oil circulation system and a cooling oil circulation system in another modified example of the turbocharger according to the third embodiment of the present disclosure.

In the third embodiment, the oil is directly supplied from the oil supply source 60 to the lubricating oil passage 40 and the cooling oil passage 50 as the lubricating oil and the cooling oil, respectively. However, as shown in FIG. 8, the oil supply source 60 may be divided into two oil supply sources 60a and 60b, and the lubricating oil passage 40 may be supplied with the oil from the oil supply source 60a by an oil supply pump 64a, while the cooling oil passage 50 may be supplied with the oil from the oil supply source 60b by an oil supply pump 64b. In other words, a lubricating oil circulation system 70 including the oil supply source 60a and the oil supply pump 64a for supplying the oil to the lubricating oil passage 40, and a cooling oil circulation system 80 including the oil supply source 60b and the oil supply pump 64b for supplying the oil to the cooling oil passage 50 may be provided. In this configuration, the lubricating oil circulation system 70 and the cooling oil circulation system 80 are independent from each other.

REFERENCE SIGNS LIST

1 Turbocharger
2 Turbine
3 Centrifugal compressor
4 Oil flow passage
5 Plate member
10 Connection pipe
20 Housing
21 Impeller
30 Housing
31 Impeller
32 Rotational shaft
33 Bearing member
34 Thrust bearing
35 Journal bearing
36 Inlet passage
37 Diffuser passage
38 Scroll passage
40 Lubricating oil passage
41 Inlet
42 First branch passage
43 Second branch passage
44 Oil supply passage
50 Cooling oil passage
51 Annular portion
51a Outlet
51b One end (of annular portion)
51c Other end (of annular portion)
51d Inlet
51e Collection port
52 Communication portion
53 Outlet
54 Second annular portion
55 Communication passage
60 Oil supply source
60a Oil supply source
60b Oil supply source
61 Oil supply line
62 Bypass line
63 Three-way valve (Switch member)
64 Oil supply pump
64a Oil supply pump
64b Oil supply pump
70 Lubricating oil circulation system
80 Cooling oil circulation system

The invention claimed is:

1. A centrifugal compressor, comprising:
a housing;
an impeller rotatably disposed within the housing;
a rotational shaft connected to the impeller; and
a bearing member supporting the rotational shaft in the housing,
wherein an oil flow passage through which oil flows is formed in the housing,
wherein the oil flow passage includes
a lubricating oil passage through which the oil flows as lubricating oil to be supplied to the bearing member, and
a cooling oil passage through which the oil flows as cooling oil for heat exchange with a fluid compressed by the impeller,
wherein the cooling oil passage is configured so that the oil flows into the cooling oil passage as the cooling oil without passing through the bearing member,
wherein all of the cooling oil having flowed through the cooling oil passage flows into the lubricating oil passage as the lubricating oil
wherein the housing has a scroll passage which are positioned on the discharge side of the impeller, and
wherein the cooling oil passage formed on the blade side of the impeller so as to surround the impeller on the circumferential inner side of the scroll passage.

2. The centrifugal compressor according to claim 1,
wherein the bearing member include a thrust bearing,
wherein the lubricating oil passage includes an oil supply passage connecting the thrust bearing and the cooling oil passage, and
wherein all of the cooling oil flowing through the cooling oil passage is supplied to the thrust bearing through the oil supply passage.

3. The centrifugal compressor according to claim 1,
wherein the housing includes a plate member positioned on a back side of the impeller, and
wherein at least a part of the cooling oil passage is formed in the plate member.

4. A turbocharger, comprising the centrifugal compressor according to claim 1.

5. The centrifugal compressor comprising:
a housing;
an impeller rotatably disposed within the housing;
a rotational shaft connected to the impeller; and
a bearing member supporting the rotational shaft in the housing,
wherein an oil flow passage through which oil flows is formed in the housing,
wherein the oil flow passage includes
   a lubricating oil passage through which the oil flows as lubricating oil to be supplied to the bearing member,
   a cooling oil passage through which the oil flows as cooling oil for heat exchange with a fluid compressed by the impeller,
a bypass line bypassing the cooling oil passage and communicating with the lubricating oil passage; and
a switch member for switching so that the oil bypasses the cooling oil passage and flows through the bypass line,
wherein the cooling oil passage is configured so that the oil flows into the cooling oil passage as the cooling oil without passing through the bearing member,
wherein all of the cooling oil having flowed through the cooling oil passage flows into the lubricating oil passage as the lubricating oil.

\* \* \* \* \*